US012103824B2

(12) United States Patent
De Rai et al.

(10) Patent No.: US 12,103,824 B2
(45) Date of Patent: Oct. 1, 2024

(54) ELEVATOR SYSTEM

(71) Applicant: Prysmian S.p.A., Milan (IT)

(72) Inventors: Luca Giorgio Maria De Rai, Milan (IT); Davide Sarchi, Milan (IT)

(73) Assignee: Prysmian S.p.A., Milan (IT)

( * ) Notice: Subject to any disclaimer, the term of this patent is extended or adjusted under 35 U.S.C. 154(b) by 0 days.

(21) Appl. No.: 18/352,814

(22) Filed: Jul. 14, 2023

(65) Prior Publication Data

US 2024/0017963 A1 Jan. 18, 2024

Related U.S. Application Data

(63) Continuation of application No. 16/775,043, filed on Jan. 28, 2020, now Pat. No. 11,745,982.

(30) Foreign Application Priority Data

Jan. 29, 2019 (IT) ........................ 102019000001257

(51) Int. Cl.
*B66B 7/12* (2006.01)
*B66B 7/06* (2006.01)

(52) U.S. Cl.
CPC ............ *B66B 7/1215* (2013.01); *B66B 7/064* (2013.01); *B66B 7/1238* (2013.01)

(58) Field of Classification Search
CPC ......... B66B 5/022; B66B 5/02; B66B 7/1215; B66B 7/06; B66B 11/0423; B66B 9/04
See application file for complete search history.

(56) References Cited

U.S. PATENT DOCUMENTS

| | | | | |
|---|---|---|---|---|
| 4,072,213 A * | 2/1978 | Salmon | B66B 7/06 188/266 |
| 5,861,084 A * | 1/1999 | Barker | B66B 7/06 187/414 |
| 7,793,763 B2 * | 9/2010 | Zhu | B66B 7/06 254/277 |
| 2003/0173556 A1 | 9/2003 | Watson | |
| 2012/0097487 A1 | 4/2012 | Winey | |

(Continued)

FOREIGN PATENT DOCUMENTS

| | | |
|---|---|---|
| CN | 101549816 A | 10/2009 |
| CN | 102471021 A | 5/2012 |

(Continued)

*Primary Examiner* — Jeffrey Donels
(74) *Attorney, Agent, or Firm* — Slater Matsil, LLP

(57) ABSTRACT

An elevator system includes a travelling cable connected to an elevator car and to a hoistway wall. The travelling cable includes an electric conductor and/or a data carrier operatively connected at a first end to a feed source and at a second end to service appliances of the elevator car. A protective layer includes an outer diameter and surrounds the electric conductor and/or data carrier. A duct is connected at a first open end to a fluid source and at a second openable end to the elevator car. A sensor system is configured for detecting swaying amplitude of the travelling cable. A microprocessor is associated to the sensor system and to the fluid source. The microprocessor is configured for receiving swaying amplitude data from the sensor system and for operating the fluid source when the swaying amplitude exceeds a predetermined threshold.

20 Claims, 4 Drawing Sheets

(56) References Cited

U.S. PATENT DOCUMENTS

| | | | | |
|---|---|---|---|---|
| 2012/0125720 | A1* | 5/2012 | Roberts | B66B 7/08<br>187/414 |
| 2014/0345978 | A1 | 11/2014 | Alasentie et al. | |
| 2014/0353091 | A1 | 12/2014 | Fauconnet et al. | |
| 2017/0260025 | A1 | 9/2017 | Benosman et al. | |
| 2018/0265327 | A1 | 9/2018 | Benosman | |
| 2019/0119070 | A1* | 4/2019 | Kang | B66B 7/08 |

FOREIGN PATENT DOCUMENTS

| | | | |
|---|---|---|---|
| JP | 63120312 | U | 8/1988 |
| JP | 05186164 | A | 7/1993 |
| JP | H05186164 | A | 7/1993 |
| JP | 2009126618 | A | 6/2009 |
| JP | 2017160050 | A | 9/2017 |

* cited by examiner

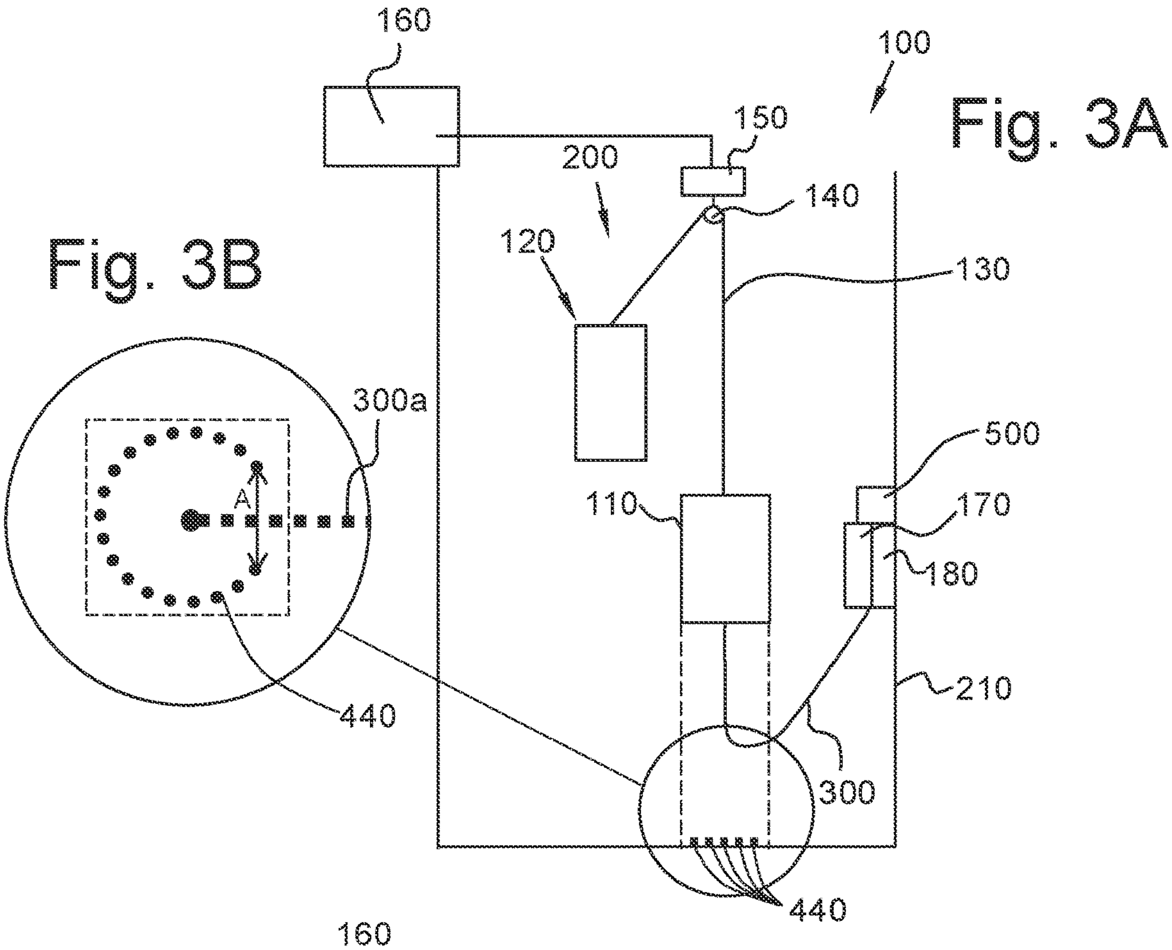
Fig. 3A
Fig. 3B
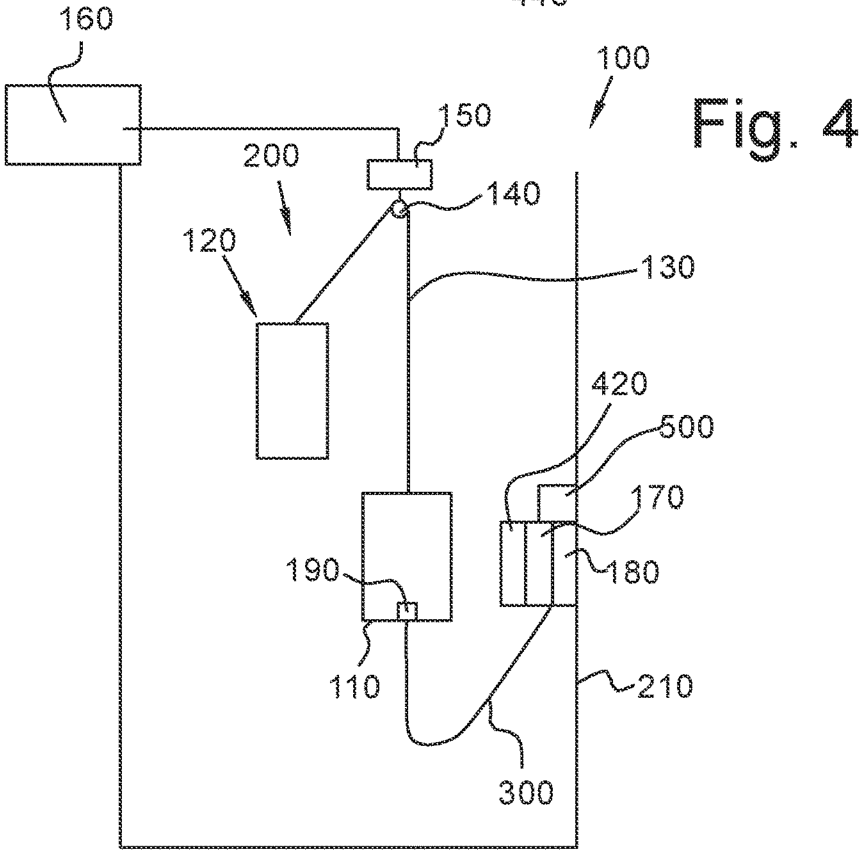
Fig. 4

ELEVATOR SYSTEM

CROSS-REFERENCE TO RELATED APPLICATIONS

This application is a continuation of U.S. application Ser. No. 16/775,043, filed on Jan. 28, 2020, which application claims the benefit of Italian Patent Application No. 102019000001257 filed on Jan. 29, 2019, which applications are hereby incorporated herein by their reference.

TECHNICAL FIELD

The present disclosure refers to an elevator system particularly for high buildings.

BACKGROUND

As it is known, an elevator system generally comprises an elevator car connected to a counterweight through a hoisting cable. The hoisting cable passes on a sheave or on a sheave system usually placed at the top of the hoistway and that is provided with a motor that, by actuating the sheave or the sheave system, moves upward or downward the elevator car by the hoisting cable. The hoisting cable is usually made by one or more steel ropes or belts.

Generally, the elevator system also comprises a travelling cable for transmitting electric power and data signals to the elevator car. In particular, a travelling cable can transmit the electric power for the service appliances of the elevator car, such as the lighting devices, the displays, the interphone, the air-conditioning system, the ventilation system and so on. As "service appliances" of the elevator car are meant all the appliances not involved in the movement of the elevator car. The travelling cable is usually made of a sheath containing electric conductors, optionally coated by an insulating layer, and/or data carriers like optical fibers.

The travelling cable is usually fixed at one end to the elevator car and at the other one end to an electrical distribution spot placed on one side wall of the hoistway, for example at an intermediate position with respect to the longitudinal length of the hoistway. The travelling cable bends and extends following the movements of the car.

In view of the increasing demand for higher and higher buildings, new challenges are posed in manufacturing elevator systems, in particular relating to the travelling cable.

The travelling cable, especially for an elevator for high building, can give rise to problems due to its swaying.

In an elevator system for high building, the elevator car can move very fast, for example at about 10 m/s. The acceleration and speed of the elevator car can cause the generation of a strong turbulence within the hoistway walls. Such turbulence, but also a building motion (in case, for example of weather challenging conditions or earthquake), can cause the travelling cable—free-hanging between the elevator car and the hoistway walls—to oscillate.

Depending on the cable form (especially when flat) and/or on the cable length, the oscillation (or swaying) can build up to large amplitudes, which can result in the travelling cable entangling with hoistway protrusion and/or suffering wearing phenomena, e.g. by rubbing against the hostway walls.

If the travelling cable rubs against the walls or gets hooked in an element in the hoistway, it will rapidly deteriorate and it will need to be substituted, increasing maintenance costs.

Moreover, since the travelling cable is usually designed to survive for a range of working cycles, the additional rapid deformations given by oscillations may cause fatigue related problems.

For the above reasons, an elevator system, especially for high building, may also needs a system to prevent the swaying of the travelling cable.

CN101549816 discloses a swing damping device for travelling cable wherein the cable is integrally mounted with a flexible hollow tube. A liquid or powder is sealed in the hollow tube and is made to stay at bending U-shaped part of the cable.

SUMMARY

In one embodiment, an elevator system comprises an elevator car comprising one or more service appliances; a hoistway in which the elevator car moves; a feed source and a fluid source associated to/in a hoistway wall; and a travelling cable connected to the elevator car and to the hoistway wall. The travelling cable comprises an electric conductor and/or a data carrier operatively connected at a first end to the feed source and at a second end to the service appliances of the elevator car, a protective layer comprising an outer diameter and surrounding the electric conductor and/or data carrier, and a duct connected at a first open end to the fluid source and at a second openable end to the elevator car. The elevator system comprises a sensor system configured for detecting a swaying amplitude of the travelling cable; and a microprocessor associated to the sensor system and to the fluid source, the microprocessor being configured for receiving the swaying amplitude data from the sensor system and for operating the fluid source when the swaying amplitude exceeds a predetermined threshold.

In another embodiment, an elevator system comprises a travelling cable connected to an elevator car and to a hoistway wall. The travelling cable comprises an electric conductor and/or a data carrier operatively connected at a first end to a feed source and at a second end to service appliances of the elevator car, a protective layer comprising an outer diameter and surrounding the electric conductor and/or data carrier, and a duct connected at a first open end to a fluid source and at a second openable end to the elevator car. The elevator system comprises a sensor system configured for detecting swaying amplitude of the travelling cable; and a microprocessor associated to the sensor system and to the fluid source, the microprocessor being configured for receiving swaying amplitude data from the sensor system and for operating the fluid source when the swaying amplitude exceeds a predetermined threshold.

In another embodiment, a method for operating an elevator system comprises providing an elevator car in a hoistway having at least one wall; providing a feed source and a fluid source associated to/in a hoistway wall; and providing a travelling cable connected to the elevator car and to the hoistway wall. The travelling cable comprises: an electric conductor and/or data carrier operatively connected at a first end to the feed source and at a second end to a service appliance of the elevator car, a protective layer surrounding the electric conductor and/or data carrier, and a duct connected at a first open end to the fluid source and at a second openable end to the elevator car. The method further includes providing a sensor system associated to the elevator car and/or to the hoistway; providing a microprocessor associated to the sensor system and to the fluid source; setting a threshold for a swaying amplitude of the travelling cable; detecting, by the sensor system, the swaying amplitude of the travelling cable during the operation of the elevator system; sending data relating the swaying amplitude detected at the sensor system to the microprocessor; and at the crossing of the threshold, operating the fluid source to pressurize the duct of the travelling cable until the swaying amplitude of the travelling cable returns below the threshold, wherein swaying of the travelling cable is damped by the operating.

BRIEF DESCRIPTION OF THE DRAWINGS

Further characteristics will be apparent from the detailed description given hereinafter with reference to the accompanying drawings, in which:

FIG. 3A is a schematic view of an elevator system according to a third embodiment of the present disclosure;

FIG. 3B is a view of the third embodiment of the present disclosure from the bottom of the elevator car;

FIG. 4 is a schematic view of an elevator system according to a fourth embodiment of the present disclosure;

DETAILED DESCRIPTION OF ILLUSTRATIVE EMBODIMENTS

Figure 1:
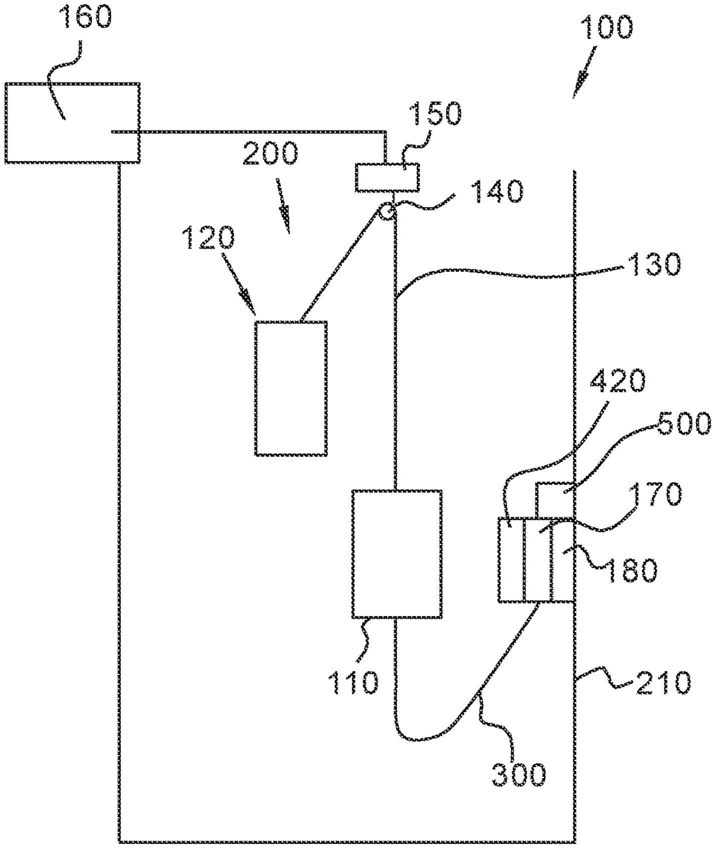
FIG. 1 is a schematic view of an elevator system according to a first embodiment of the present disclosure.

The Applicant has faced the problem of limiting the possible swaying of the travelling cable in elevator system, especially for very high buildings.

The Applicant found that the travelling cable swaying can be damped by changing the flexibility of the travelling cable, in particular by stiffening the travelling cable in response to a selected swaying amplitude.

Then, the Applicant realized to provide a duct in the travelling cable and to connect the duct to a fluid source to be operated to pressurize the duct, thus stiffening the travelling cable.

The pressurization of the cable duct changes the oscillatory properties of the travelling cable and in particular damps the excited oscillation modes that causes the swaying of the travelling cable beyond the acceptability limits.

Moreover, the Applicant has thought to provide the elevator system with a sensing system capable of detecting the swaying of the travelling cable; in this way, it is possible to control the fluid source operation and, accordingly, the stiffness and the swaying degree of the trailing cable on the basis of the detection of the sensing system.

According to a first embodiment, the present disclosure relates to an elevator system comprising: an elevator car comprising one or more service appliances; a hoistway in which the elevator car moves; a feed source and a fluid source associated to/in a hoistway wall; a travelling cable connected to the elevator car and to the hoistway wall, wherein the travelling cable comprises: an electric conductor and/or a data carrier operatively connected at a first end to the feed source and at a second end to the a service appliance of the elevator car; a protective layer having an outer diameter and surrounding the electric conductor and/or data carrier; and a duct connected at a first open end to the fluid source and at a second openable end to the elevator car; a sensor system configured for detecting swaying amplitude of the travelling cable; and a processing and control unit associated to the sensor system and to the fluid source, the processing and control unit being configured for receiving swaying amplitude data from the sensor system and for operating the fluid source when the swaying amplitude exceeds a predetermined threshold.

For the purpose of the present description and claims, as "feed source" is meant a source providing electric current and/or data.

In a second aspect, the present disclosure relates to a method for damping the swaying amplitude of a travelling cable in an elevator system, the method comprising: providing an elevator car in a hoistway having at least one wall; providing a feed source and a fluid source associated to/in a hoistway wall; providing a travelling cable connected to the elevator car and to the hoistway wall, wherein the travelling cable comprises: an electric conductor and/or data carrier operatively connected at a first end to the feed source and at a second end to a service appliance of the elevator car; a protective layer surrounding the electric conductor and/or data carrier; and a duct connected at a first open end to the fluid source and at a second openable end to the elevator car; providing a sensor system associated to the elevator car and/or to the hoistway; providing a processing and control unit associated to the sensor system and to the fluid source; setting a threshold of the travelling cable swaying amplitude; detecting the swaying amplitude of the travelling cable by the sensor system; sending swaying amplitude data from the sensor system to the processing and control unit; at the crossing of the threshold, operating the fluid source to pressurize the duct of the travelling cable until the travelling cable swaying amplitude returns below the threshold.

In the elevator system of the present disclosure, the data carrier comprised in the travelling cable can be a copper pair and/or an optical fiber (an optical waveguide surrounded by one or more protective layers).

In the elevator system of the present disclosure, the travelling cable can comprise one or more ducts.

In an embodiment, the protective layer of the travelling cable surrounds the duct, too, which is in form of a tube.

In an alternative embodiment, the travelling cable comprises a jacket surrounding the protective layer and the duct, which is in form of a tube.

These embodiments ease the connection of the travelling cable to the feed source and to the fluid source.

In a further embodiment, the travelling cable comprises a jacket and a gap between the jacket inner diameter and the outer diameter of the protective layer, such gap being the duct.

In this case the change of the flexibility of the travelling cable due to the pressurization of the duct is very fast since the duct has a cross-section enveloping the cross-section of the protective layer.

In the elevator system of the present disclosure, the first end of the travelling cable connecting the electric conductor and/or data carrier to the feed source is adjacent, though operatively separated, to the first open end of the duct connected to the fluid source. Analogously, the second end of the travelling cable operatively connected to a service appliance of the elevator car is adjacent, though operatively separated, to the second openable end of the duct.

In an embodiment, the sensor system comprises a sensing tool in form, for example, of an optical fiber shape sensor provided in the travelling cable, for example within the protective layer, and operatively connected to an optical equipment associated to/in the elevator car or the hoistway wall in order to detect deformation of the travelling cable. This configuration of the sensor system is more easy to install since the sensing tool is directly included into the travelling cable and therefore it takes just to install an optical equipment, for example in the hostway wall. In an embodiment, the optical equipment is installed at a position in the vicinity of the fluid source and of the feed source.

In an embodiment, the fluid source and the power source are installed at about halfway the elevator car run.

According to this embodiment, the processing and control unit is connected to the optical equipment and in this embodiment, the processing and control unit is programmed to operate (or not) the fluid source on the basis of deformations (like torsion, elongation, etc.) of the travelling cable caused by the swaying amplitude and detected by the optical fiber shape sensor and the optical equipment.

In an alternative embodiment, the sensor system comprises a position monitoring system with one or more cameras associated to the elevator car or to the hoistway. The cameras are positioned to detect the displacement of the travelling cable in a plane transverse to the longitudinal axis of the hoistway.

In this case, the processing and control unit is programmed to process the images acquired by the camera/s for determining the crossing of the threshold of the swaying amplitude and for operating (or not) the fluid source accordingly.

In a further alternative embodiment the sensor system comprises a laser based monitoring system comprising a plurality of laser telemeters associated to the elevator car and/or the hoistway, for example in the hoistway bottom.

In an embodiment, the plurality of laser telemeters is positioned in a substantially circular array in/on the elevator car outer bottom facing the hostway floor or in/on the hostway floor within the orthogonal projection of the elevator car. Laser telemeters are to be positioned so as to avoid intercepting the normal course of the trailing cable from the first end towards the second end, and any swaying amplitude below the predetermined threshold.

In this case the processing and control unit is programmed to determine the swaying amplitude on the basis of the displacement of the travelling cable detected by the laser telemeters.

In this way, the detection of the swaying amplitude can be very accurate.

In an embodiment, the elevator system comprises an auxiliary fluid source associated to/in the elevator car and operatively connected to the second openable end of the travelling cable duct and to the processing and control unit, the latter being configured for operating the auxiliary fluid source in order to pressurize the duct by means of the combined action of the fluid sources.

For the purpose of the present description and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Also, the terms "a" and "an" are employed to describe elements and components of the disclosure. This is done merely for convenience and to give a general sense of the disclosure. This description should be read to include one or at least one, and the singular also includes the plural unless it is obvious that it is meant otherwise.

An elevator system 100 according to the present disclosure is shown in FIGS. 1-4.

The elevator system 100 comprises an elevator car 110, a hoistway 200 in which the elevator car 110 can move, a counterweight 120, a hoisting cable 130 connecting the elevator car 110 to the counterweight 120 and a travelling cable 300 connected to the elevator car 110 and to a hoistway wall 210.

In particular, the hoisting cable 130 passes on a sheave or sheave system 140 usually placed at the top of the hoistway 200. The sheave or sheave system 140 is operatively connected to a motor 150 actuating the sheave or sheave system 140 to make moving the elevator car 110 upward or downward by the hoisting cable 130.

The motor 150 is operatively connected to a controller 160 configured to actuate the motor 150 according to a command signal generated by a user, for example by pushing the call button for the elevator car 110.

The elevator car 110 can comprise one or more electrical service appliances, like, for example, one or more lighting devices, one or more displays, the interphone, the air-conditioning system, the ventilation system and so on.

A feed source 170 and a fluid source 180 are associated to/in the hoistway wall 210. In particular, they are positioned close to each other at the connection point of the travelling cable 300.

The feed source 170 can be suitable for supplying electric power for the one or more electrical service appliances of the elevator car 110. For example, the feed source 170 is suitable for supplying an electric power amounting to 1 kW, or 3 kW, or 8 kW. In addition or alternatively, the feed source 170 can provide data, like temperature value for adjusting the air-con, and technical info for the operation of the elevator car.

The fluid source 180 can be a pump connected to a tank containing a liquid or to the water supply system, or a compressor.

As from FIGS. 5*a*-5*d*, the travelling cable 300 can comprise two electric conductors and/or data carriers 310 (for example, optical fibers) and a duct 320. The electric conductors and/or data carriers 310 are operatively connected at a first end to the feed source 170 and at a second end to the one or more electrical service appliances of the elevator car 110. In this way, the travelling cable 300 provides electrical power/data from the feed source 170 to the one or more electrical service appliances of the elevator car 110.

The duct 320 is operatively connected at a first open end to the fluid source 180 and at a second openable end to the elevator car 110.

FIGS. 5*a*-5*d* show four different embodiments of a travelling cable according to the present disclosure.

Figure 5A:
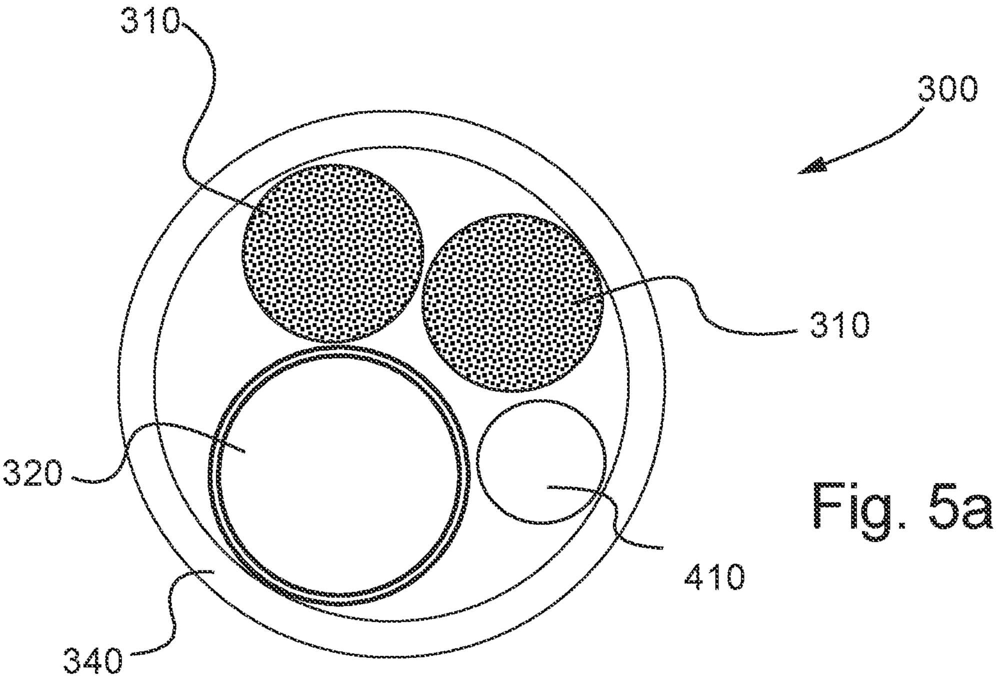
FIGS. 5*a*-5*d* are schematic cross-sectional views of four different travelling cables that can be included in the elevator system according to the present disclosure.

In the travelling cable 300 of FIG. 5*a* the duct 320 is housed in a protective layer 340 together with the electric conductors and/or data carriers 310. In the present embodiment, a sensing tool 410 in form of an optical fiber shape sensor is also present within the protective layer 340.

Figure 5B:
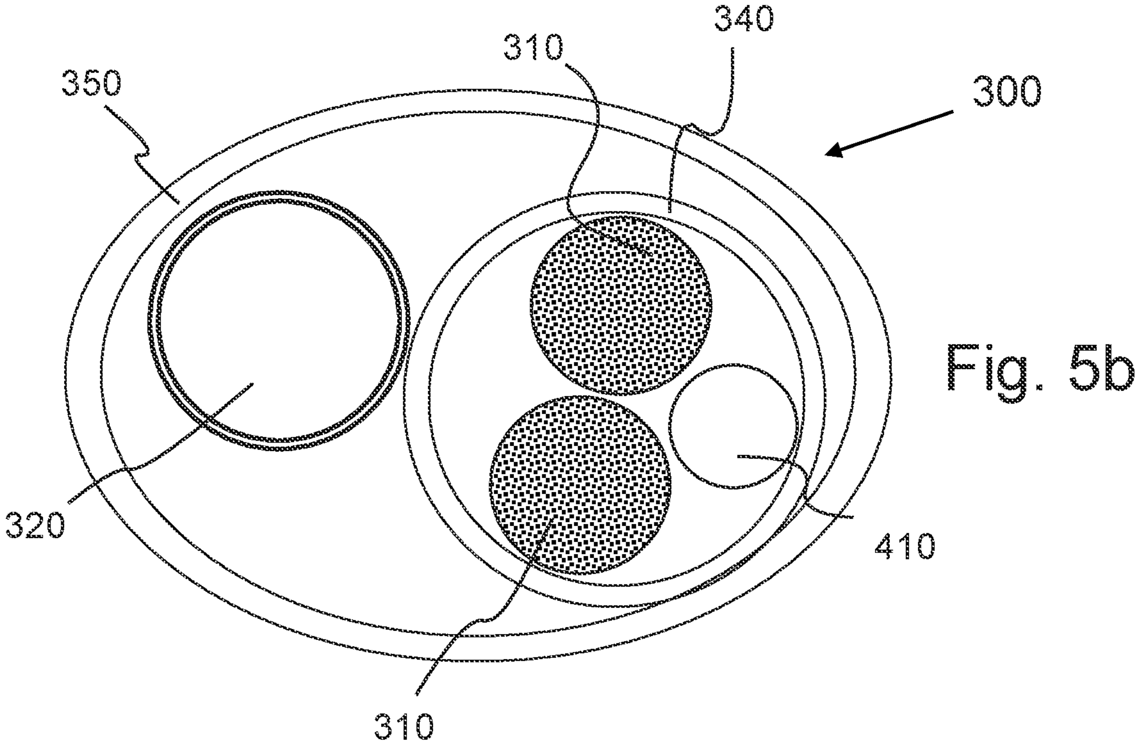

In the travelling cable 300 of FIG. 5*b* the duct 320 is surrounded by a jacket 350 also enclosing the protective layer 340 surrounding the electric conductors and/or data carriers 310. In the present embodiment, a sensing tool 410 in form of an optical fiber shape sensor is also present within the protective layer 340.

Figure 5C:
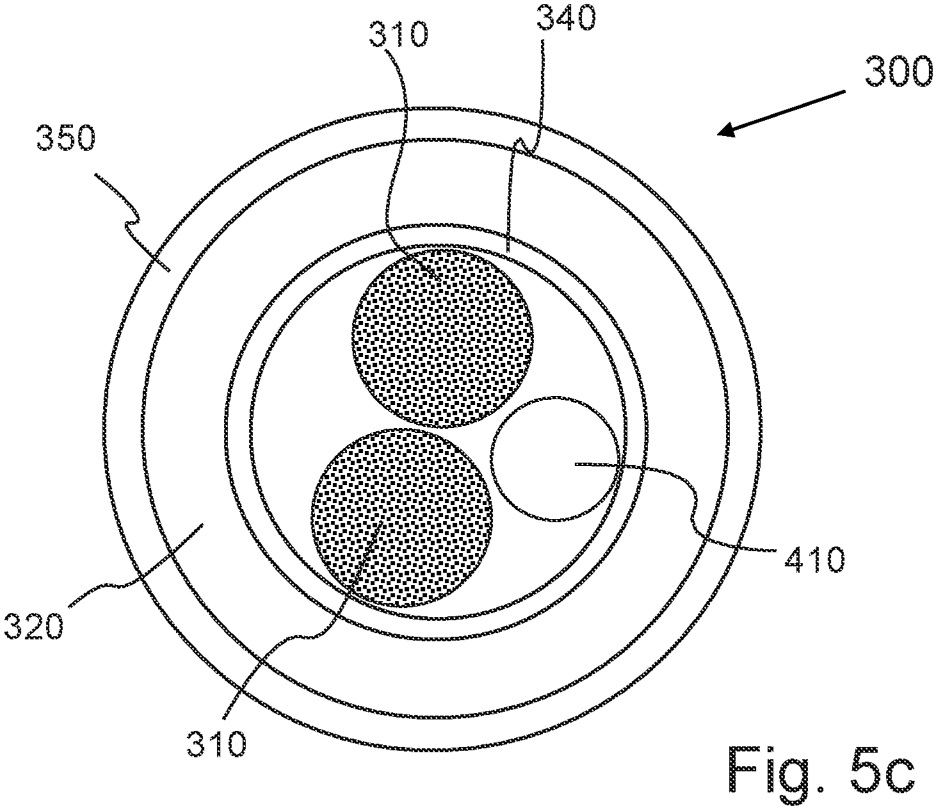

While in the embodiments of FIGS. 5*a* and 5*b* the duct 320 is a tube, in the travelling cable 300 of FIG. 5*c* the duct 320 is the gap between the jacket 350 and the protective layer 340 surrounded by the jacket 350. In the present embodiment, a sensing tool 410 in form of an optical fiber shape sensor is also present within the protective layer 340.

Figure 5D:
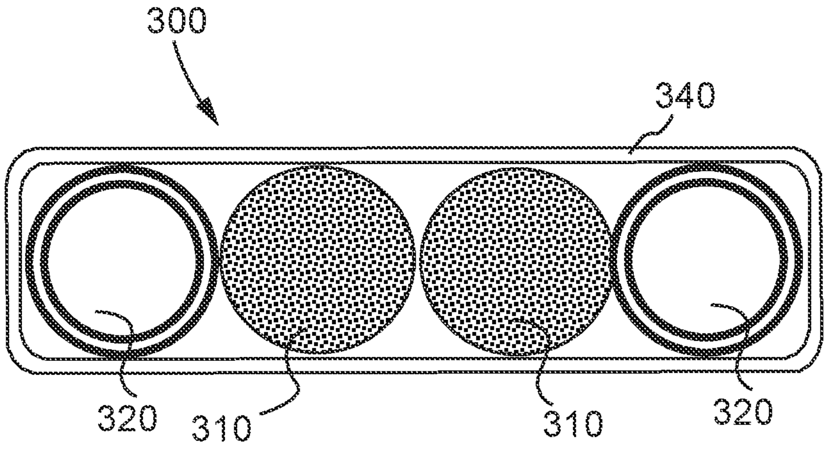

FIG. 5*d* schematically shows a flat travelling cable 300 for the system of the present disclosure. In this travelling cable 300 two ducts 320 are present and housed in a protective layer 340 together with the electric conductors and/or data carriers 310.

With reference to FIGS. 1-4, the fluid source 180 is operatively connected to the duct/s 320 in the travelling cable 300 so that such a fluid source 180 can be operated to pressurize the duct/s 320.

As from FIG. 4, the elevator system wo can also comprise an auxiliary fluid source 190 associated to/in the elevator car 110; the auxiliary fluid source 190 can be a pump connected to a tank containing a liquid or a compressor. The second openable end of the duct/s 320 is operatively connected to the auxiliary fluid source 190 so that the duct/s 320 can be pressurized by the combined action of the two fluid sources 180, 190.

The elevator system 100 further comprises a sensor system associated to the elevator car 110 and/or to the hoistway 200; such a sensor system is configured for detecting swaying of the travelling cable 300.

According to the embodiment illustrated in FIG. 1, the sensor system comprises a sensing tool 410 included into the travelling cable 300 (see FIGS. 5*a*-5*c*) operatively connected to an optical equipment 420. The optical equipment 420 can be provided to/in the elevator car no or the hoistway wall 210 positioned at the connection points of the travelling cable 300.

The optical equipment 420 is, for example, an optical spectrum analyzer.

The sensing tool in form of an optical fiber shape sensor is an optical fiber that presents along its longitudinal axis a Bragg-grating structure. Such a sensing tool allows to detect the deformation of the travelling cable in which is included, and consequently to estimate the amplitude of the travelling cable swaying.

Figure 2:
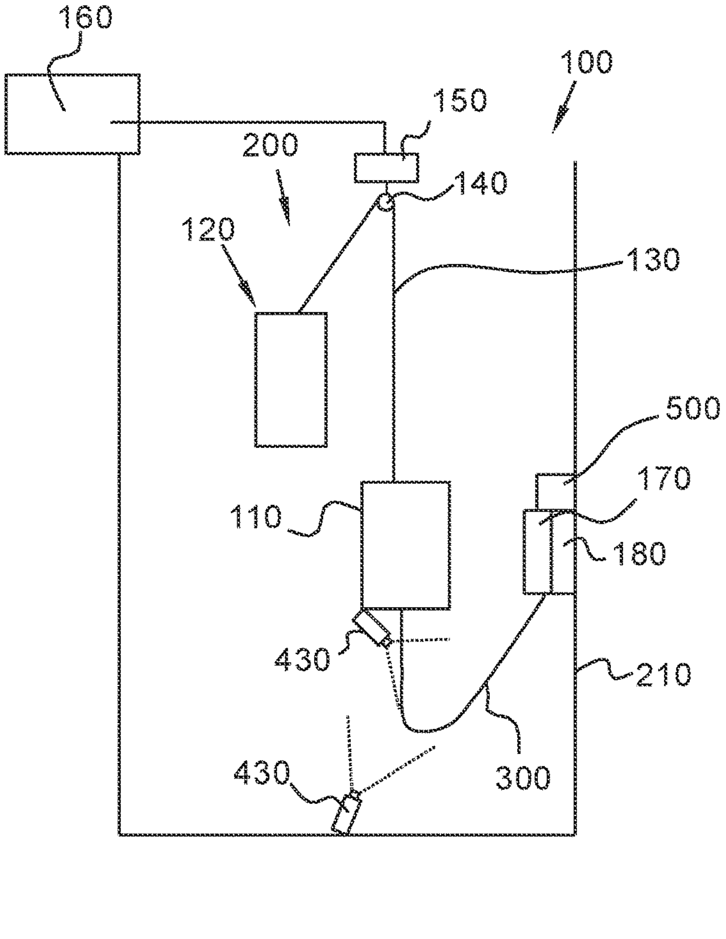
FIG. 2 is a schematic view of an elevator system according to a second embodiment of the present disclosure.

Alternatively, as illustrated in FIG. 2, the sensor system comprises a position monitoring system including one or more cameras 430 associated to the elevator car 110 and/or to the hoistway 200. For example, the camera 430 can be positioned on the floor of the hoistway 200 or at the bottom of the elevator car 110 so as to capture images of the travelling cable 300 during the movement of the same.

In a further alternative embodiment, illustrated in FIG. 3, the sensor system comprises a laser based position monitoring system that comprises a plurality of laser telemeters 440 associated to the elevator car 110 and/or, like in the present case in/on the floor of the hoistway 200, and positioned to detect the displacement of the travelling cable 300 in a plane transverse to the longitudinal axis of the hoistway 200.

FIG. 3B is an aerial view from the bottom of the elevator car 110 of such possible laser telemeter system in which multiple laser telemeters 440 are positioned within the orthogonal projection of the elevator car 110. The area of the travelling cable projection 300*a* is free from laser telemeters 440 as well as an area surrounding it to an extension such to avoid the laser telemeters 440 to intercept the swaying of the travelling cable with an amplitude lower than the predetermined swaying amplitude threshold which in the present case has the extension indicated with the double-arrow line A.

As from FIGS. 1-4, the elevator system 100 comprises a processing and control unit 500, for example a microprocessor, associated to the sensor system and to the fluid source 180 and configured for detecting a swaying amplitude exceeding a predetermined threshold and consequently operating the fluid source 180 to pressurize the duct/s 320 in order to damp the travelling cable swaying to an amplitude below the predetermined threshold. In case the elevator system 100 is provided also with the auxiliary fluid source 190, the processing and control unit 500 is also operatively associated to the auxiliary fluid source 190—for example by wi-fi signal or by the electric conductor/data carrier of the travelling cable—in order to control its operation so as to pressurize the duct/s 320 by the combined action of the fluid sources 180, 190.

As "swaying amplitude" it is meant the distance on a plane transverse to the longitudinal axis of the hoistway between the orthogonal projection of the connection point of the travelling cable 300 to the elevator car 110 and the orthogonal projection of the bending point of the travelling cable 300.

The processing and control unit 500 is, in particular, programmed to receive and to process the detections of the sensor system components 410, 420, 430, 440 so as to obtain the value of the amplitude of the travelling cable swaying.

In particular, in the embodiment of FIG. 1, the processing and control unit 500 is connected to the optical equipment 420 and is programmed to determine the swaying amplitude on the basis of the deformation of the sensing tool 410 detected by the optical equipment 420.

In the embodiment of FIG. 2, the processing and control unit 500 is programmed to process the images acquired by the cameras 430 for determining the swaying amplitude.

In the embodiment of FIG. 3, the processing and control unit 500 is programmed to determine the swaying amplitude on the basis of the displacement of the travelling cable 300 detected by the laser telemeters 440.

In any case, the predetermined threshold, as well as the control strategy of the fluid source 180 and eventually of the auxiliary fluid source 190, can be set by a user through a terminal before or after the commissioning of the elevator system.

What is claimed is:

1. An elevator system comprising:
- an elevator car comprising one or more service appliances;
- a hoistway in which the elevator car moves;
- a feed source and a fluid source associated with a hoistway wall;
- a travelling cable connected to the elevator car and to the hoistway wall, wherein the travelling cable comprises
  - an electric conductor and/or a data carrier operatively connected at a first end to the feed source and at a second end to the service appliances of the elevator car,
  - a protective layer comprising an outer diameter and surrounding the electric conductor and/or data carrier, and
  - a duct connected at a first open end to the fluid source and at a second openable end to the elevator car;
- a sensor system configured for detecting a swaying amplitude of the travelling cable; and
- a microprocessor associated to the sensor system and to the fluid source, the microprocessor being configured for receiving swaying amplitude data from the sensor system and for operating the fluid source when the swaying amplitude exceeds a predetermined threshold.

2. The elevator system according to claim 1, wherein the protective layer of the travelling cable surrounds the duct.

3. The elevator system according to claim 1, wherein the travelling cable comprises a jacket surrounding the protective layer and the duct.

4. The elevator system according to claim 1, wherein the travelling cable comprises a jacket having an inner diameter and a gap between the jacket inner diameter and the outer diameter of the protective layer, the gap comprising the duct.

5. The elevator system according to claim 1, wherein the sensor system comprises a sensing tool included into the travelling cable and coupled to an optical equipment.

6. The elevator system according to claim 5, wherein the sensing tool is surrounded by the protective layer.

7. The elevator system according to claim 5, wherein the optical equipment is installed at a position in vicinity of the fluid source and of the feed source.

8. The elevator system according to claim 5, wherein the microprocessor is connected to the optical equipment.

9. The elevator system according to claim 1, wherein the sensor system comprises a position monitoring system with one or more cameras associated to the elevator car or to the hoistway.

10. The elevator system according to claim 1, wherein the sensor system comprises a laser based position monitoring system comprising a plurality of laser telemeters associated with the elevator car and/or the hoistway.

11. The elevator system according to claim 10, wherein the laser telemeters are positioned in a substantially circular array.

12. The elevator system according to claim 1, further comprising an auxiliary fluid source associated with the elevator car and operatively connected to the second openable end of the duct and to the microprocessor.

13. A method for operating an elevator system, the method comprising:

providing an elevator car in a hoistway having at least one wall;

providing a feed source and a fluid source associated with a hoistway wall;

providing a travelling cable connected to the elevator car and to the hoistway wall, wherein the travelling cable comprises: an electric conductor and/or data carrier operatively connected at a first end to the feed source and at a second end to a service appliance of the elevator car, a protective layer surrounding the electric conductor and/or data carrier, and a duct connected at a first open end to the fluid source and at a second openable end to the elevator car;

providing a sensor system associated to the elevator car and/or to the hoistway;

providing a microprocessor associated to the sensor system and to the fluid source;

setting a threshold for a swaying amplitude of the travelling cable;

detecting, by the sensor system, the swaying amplitude of the travelling cable during the operation of the elevator system;

sending data relating the swaying amplitude detected at the sensor system to the microprocessor; and at the crossing of the threshold, operating the fluid source to pressurize the duct of the travelling cable until the swaying amplitude of the travelling cable returns below the threshold, wherein swaying of the travelling cable is damped by the operating.

14. The method according to claim 13, further comprising measuring deformation of the travelling cable by a sensing tool of the sensor system, wherein the sensing tool is disposed within the travelling cable and coupled to an optical equipment, wherein the sensing tool is surrounded by the protective layer, wherein the optical equipment is disposed proximate to the fluid source and to the feed source, wherein the microprocessor is coupled to the optical equipment.

15. The method according to claim 13, wherein detecting the swaying amplitude comprises monitoring the travelling cable with one or more cameras associated to the elevator car or to the hoistway.

16. The method according to claim 13, wherein detecting the swaying amplitude comprises monitoring the travelling cable with a laser based position monitoring system comprising a plurality of laser telemeters associated to the elevator car and/or the hoistway, wherein the laser telemeters are positioned in a substantially circular array.

17. The method according to claim 13, further comprising at the crossing of the threshold, operating an auxiliary fluid source to operatively connect to the second openable end of the duct, wherein the duct is pressurized by a combined action of the fluid source and the auxiliary fluid source.

18. An elevator system comprising:

a travelling cable connected to an elevator car and to a hoistway wall, wherein the travelling cable comprises an electric conductor and/or a data carrier operatively connected at a first end to a feed source and at a second end to service appliances of the elevator car, a protective layer comprising an outer diameter and surrounding the electric conductor and/or data carrier, and a duct connected at a first open end to a fluid source and at a second openable end to the elevator car;

a sensor system configured for detecting swaying amplitude of the travelling cable; and a microprocessor associated to the sensor system and to the fluid source, the microprocessor being configured for receiving swaying amplitude data from the sensor system and for operating the fluid source when the swaying amplitude exceeds a predetermined threshold.

19. The elevator system according to claim 18, wherein the sensor system comprises a sensing tool disposed within the travelling cable and coupled to an optical equipment, wherein the sensing tool is surrounded by the protective layer, wherein the optical equipment is disposed proximate to the fluid source and to the feed source, and wherein the microprocessor is coupled to the optical equipment.

20. The elevator system according to claim 19, wherein the sensing tool comprises an optical fiber with a Bragg-grating structure along a longitudinal axis of the optical fiber, and wherein the sensing tool is configured to detect deformation of the travelling cable during operation.

* * * * *